United States Patent
Park et al.

(10) Patent No.: US 7,632,002 B1
(45) Date of Patent: Dec. 15, 2009

(54) BACKLIGHT UNIT

(75) Inventors: Jong Jin Park, Daejeon-si (KR); Geun Young Kim, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 12/338,350

(22) Filed: Dec. 18, 2008

(30) Foreign Application Priority Data

Oct. 24, 2008 (KR) .................. 10-2008-0104721

(51) Int. Cl.
*F21V 7/04* (2006.01)
(52) U.S. Cl. .................. 362/616; 362/613; 362/633; 362/634; 349/65
(58) Field of Classification Search .................. 362/27, 362/613, 616, 632–634; 349/65
See application file for complete search history.

(56) References Cited

U.S. PATENT DOCUMENTS 7,186,013 B2 * 3/2007 Jeong et al. .................. 362/555
7,413,334 B2 * 8/2008 Baba .......................... 362/616

FOREIGN PATENT DOCUMENTS

KR 10-2006-0119781 11/2006

* cited by examiner

*Primary Examiner*—Stephen F Husar
(74) *Attorney, Agent, or Firm*—McDermott Will & Emery LLP

(57) ABSTRACT

The present invention relates to a backlight unit including a bottom case including a receiving space; a plurality of divided light guide panels arranged in the receiving space in parallel; light source units arranged at one side of each of the divided light guide panels; and fixing members for preventing movement of the light guide panels by being arranged between the divided light guide panels in order to prevent the movement of the divided light guide panels.

8 Claims, 3 Drawing Sheets

[FIG. 1]
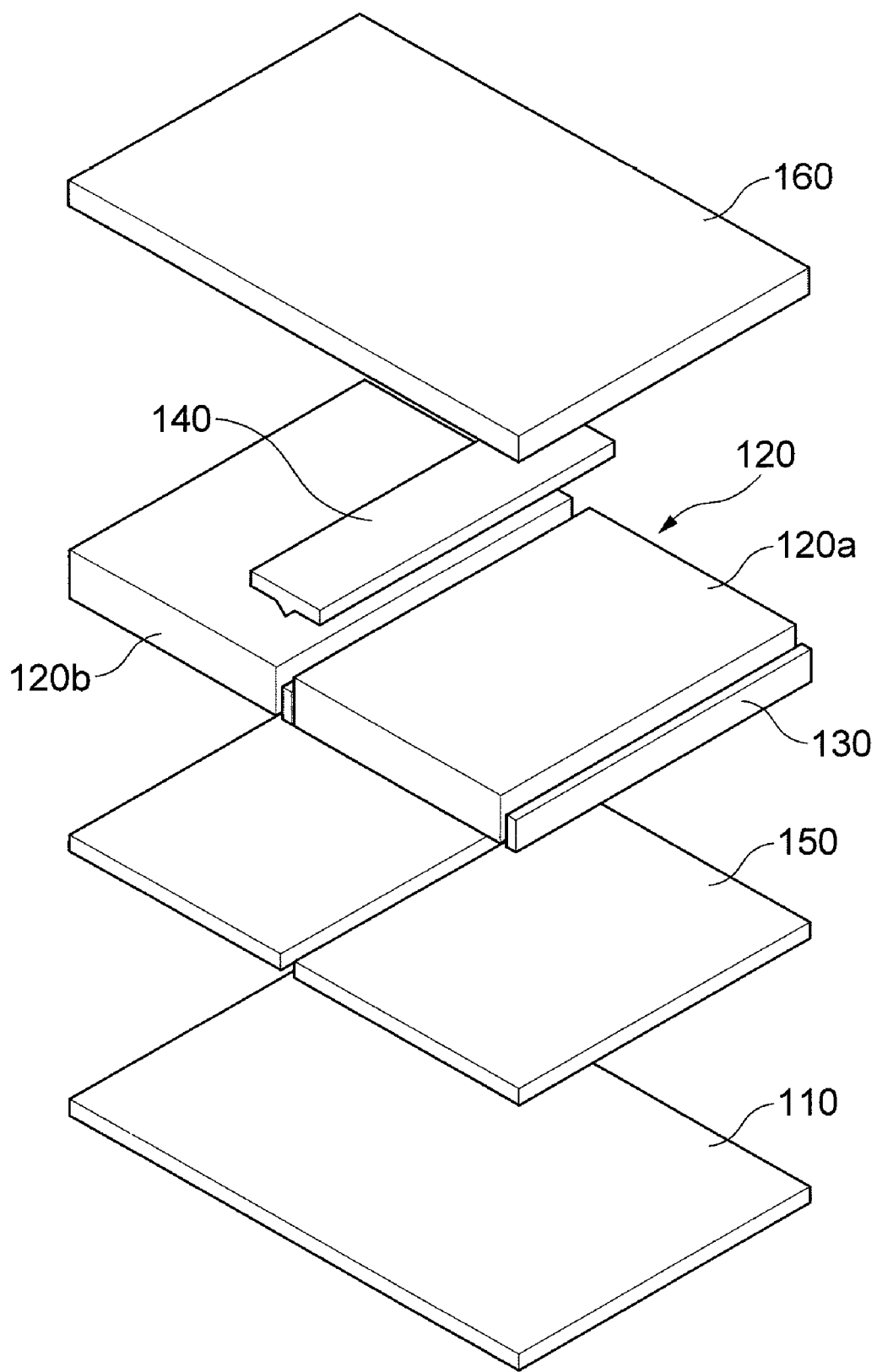

[FIG. 2]
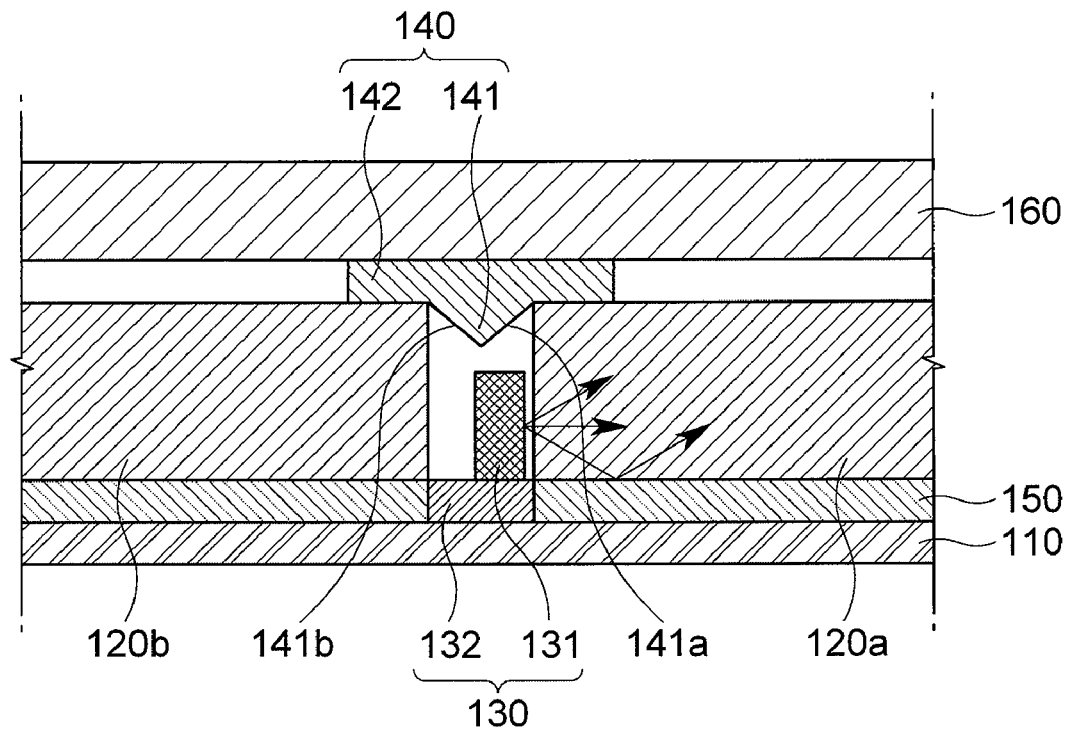
[FIG. 3]
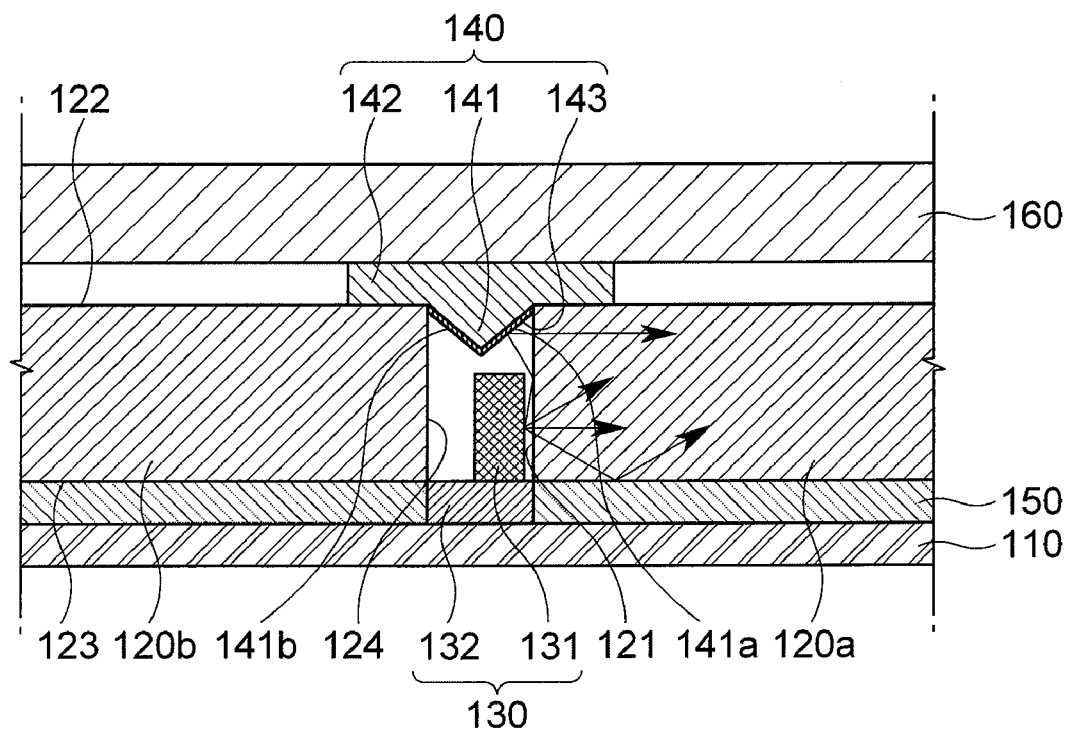

[FIG. 4]
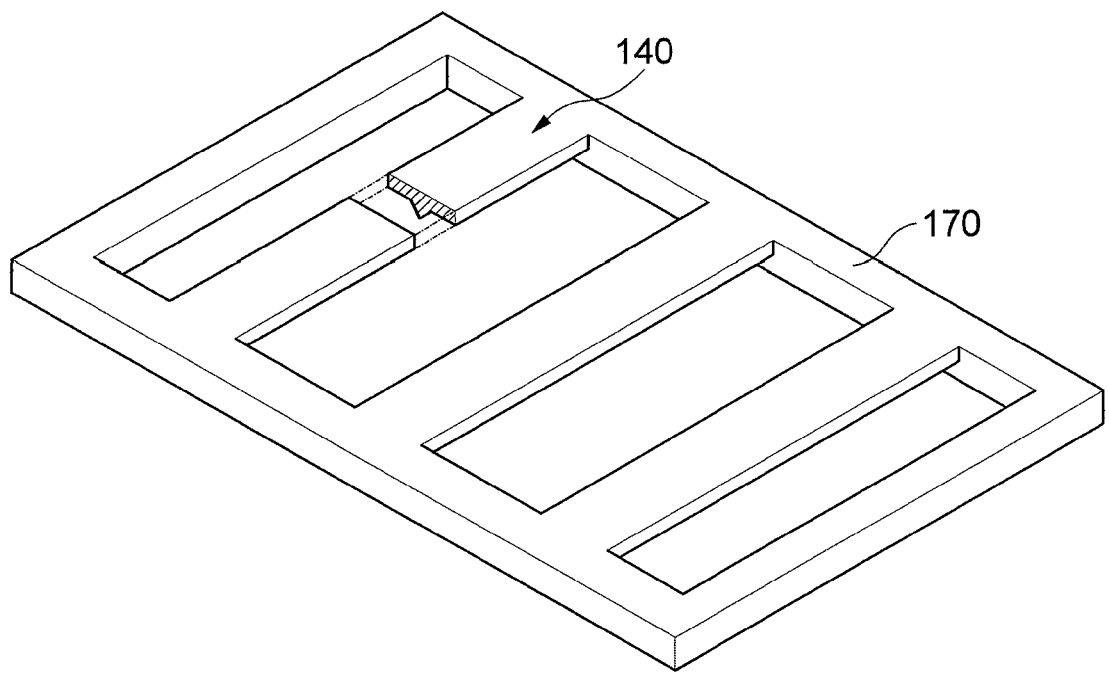

BACKLIGHT UNIT

CROSS-REFERENCE TO RELATED APPLICATIONS

This application claims the benefit of Korean Patent Application No. 10-2008-0104721 filed with the Korea Intellectual Property Office on Oct. 24, 2008, the disclosure of which is incorporated herein by reference.

BACKGROUND OF THE INVENTION

1. Field of the Invention

The present invention relates to a backlight unit; and, more particularly, to a backlight unit including fixing members capable of preventing movement of a plurality of divided light guide panels.

2. Description of the Related Art

A liquid crystal display has many advantages such as implementation of weight reduction, thickness reduction, low-power driving and high resolution. Therefore, nowadays, a display has been replaced from a cathode-ray tube to the liquid crystal display.

The liquid crystal display includes a backlight unit and a liquid crystal panel which are coupled to each other. The backlight unit generates light in order to supply the light to the liquid crystal panel. The liquid crystal panel includes a liquid crystal panel for displaying an image by adjusting transmittance of the light supplied from the backlight. Such a liquid crystal display implements a high quality image by uniformly supplying high brightness light of the backlight unit to the liquid crystal panel.

Herein, the backlight unit requires high power to generate the light having the high brightness, which increases power consumption of the liquid crystal display.

In order to solve the problem, a local dimming driving method of the backlight unit has been developed to supply light with partially adjusted brightness to the liquid crystal panel. A structure of the backlight unit employing the local dimming method includes a plurality of divided groups. Herein, each of the groups includes one or two or more divided light guide panels and light sources which are arranged at one side of each of the light guide panels. At this time, the backlight unit employing the local dimming method generates light with brightness values adjusted by the groups in order to partially supply the light to the liquid crystal panel. That is, some groups of the backlight unit corresponding to some portions of a screen which are displayed brightly generate light with high brightness and the other groups of the backlight unit corresponding to the other portions of the screen generate light with low brightness or are turned off.

Therefore, if the liquid crystal display partially requires high brightness, it is possible to partially drive the backlight unit, thereby reducing power consumption of the backlight unit. In addition, the backlight unit implementing the local dimming driving method can partially control the brightness, thereby improving a contrast ratio of the liquid crystal display.

However, since the backlight unit employing the local dimming driving method has the plurality of divided light guide panels, there are caused many problems due to movement of the light guide panels, for example, generation of noise, deterioration of an image quality characteristic of the liquid crystal display and damage of an optical sheet arranged at upper portions of the light guide panels due to the movement of the light guide panels.

SUMMARY OF THE INVENTION

The present invention has been invented in order to overcome the above-described problems and it is, therefore, an object of the present invention to provide a backlight unit capable of preventing movement of a plurality of divided light guide panels by including fixing members for fixing the plurality of divided light guide panels.

In accordance with one aspect of the present invention to achieve the object, there is provided a backlight unit including a bottom case provided with a receiving space; a plurality of divided light guide panels arranged in the receiving space in parallel; light source units arranged at one side of each of the divided light guide panels; and fixing members for preventing movement of the light guide panels by being arranged between the divided light guide panels.

Herein, each of the fixing members includes an insertion unit inserted between the divided light guide panels and a head unit connected to the insertion unit and arranged at edges of upper ends of the divided light guide panels.

Further, the insertion unit includes first and second inclined surfaces connected to the head unit by being expanded from an end portion to both sides respectively Further, the backlight unit includes a reflection film for reflecting a portion or the whole of light by being arranged on the insertion unit.

Further, the backlight unit includes an optical member supported by the fixing members and arranged above the divided light guide panels.

Further, the backlight unit includes reflection members arranged at lower parts of each of the divided light guide panels.

Further, the fixing members are made of material to transmit light.

Further, the backlight unit further includes a fixing frame which connects the fixing members to each other and is coupled to the bottom case.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a perspective view illustrating a backlight unit in accordance with a first embodiment of the present invention;

FIG. 2 is a cross-sectional view obtained by cutting the backlight unit shown in FIG. 1;

FIG. 3 is a cross-sectional view illustrating a backlight unit in accordance with a second embodiment of the present invention; and FIG. 4 is a perspective view illustrating fixing members included in a backlight unit in accordance with a third embodiment of the present invention.

DETAILED DESCRIPTION OF THE PREFERABLE EMBODIMENTS

Hereinafter, preferable embodiments for a backlight unit in accordance with the present invention will be described in detail with reference to the accompanying drawings. The following embodiments are provided as examples to allow those skilled in the art to sufficiently appreciate the spirit of the present invention. Therefore, the present invention can be implemented in other types without limiting to the following embodiments. And, the size and the thickness of an apparatus may be overdrawn in the drawings for more clear description. The same component is represented by the same reference numeral hereinafter.

FIG. 1 is a perspective view illustrating a portion of a backlight unit in accordance with a first embodiment of the present invention.

FIG. 2 is a cross-sectional view obtained by cutting the backlight unit shown in FIG. 1.

Herein, although the backlight unit in accordance with the embodiment of the present invention includes a plurality of divided light guide panels, first and second light guide panels among the plurality of light guide panels are limitarily illustrated for convenience of description Referring to FIG. 1 and FIG. 2, the backlight unit includes a bottom case 110, a light guide panel 120, light source units 130 and fixing members 140.

The bottom case 110 has a receiving space. For instance, the receiving space can be formed by a bottom surface of the bottom case 110 and side walls which are bent from edges of the bottom surface.

The light guide panel 120 is divided into a plurality of light guide panels 120a and 120b. The plurality of divided light guide panels 120a and 120b are arranged in the receiving space of the bottom case 110 in parallel.

Although the light guide panel 120 is illustrated in a rectangular shape, it can have several shapes such as a triangle and a hexagon without limiting to this.

The light source units 130 are arranged at one side of each of the light guide panels 120a and 120b to supply light to each of the light guide panels 120a and 120b. Each of the light source units 130 includes a light source 131 for generating the light and a printed circuit board 132 including a plurality of circuit patterns for applying a driving voltage of the light source 131.

The light source 131 can be a light emitting diode as one example to emit the light when a current is applied. Herein, the light emitting diode can have various types. For instance, the light emitting diode can include sub light emitting diodes each of which implements blue, green and red. At this time, white light can be implemented by mixing blue light, green light and red light which are emitted from the sub light emitting diodes for implementing the blue, the green and the red respectively. Or, the light emitting diode can include a blue light emitting diode and a fluorescent substance for converting a portion of blue light emitted from the blue light emitting diode into yellow light. At this time, white light can be implemented by mixing the blue light and the yellow light.

The light generated from the light source unit 130 is impinged to a side surface of the light guide panel 120 and emitted upward through total reflection inside the light guide panel 120.

The fixing members 140 prevent the divided light guide panels 120a and 120b from individually moving by being arranged between the divided light guide panels 120a and 120b.

Each of the fixing members 140 includes an insertion unit 141 and a head unit 142 which is connected to the insertion unit 141.

The insertion unit 141 can prevent the divided light guide panels 120a and 120b from moving horizontally by being inserted between the divided light guide panels 120a and 120b. In other words, the insertion unit 141 is inserted between adjacent first and second light guide plates 120a and 120b among the divided light guide panels 120a and 120b. Herein, the insertion unit 141 includes first and second inclined surfaces 141a and 141b connected to the head unit 142 by being expanded from an end portion to both sides.

That is, the insertion unit 141 can have a triangle-shaped cross section. Therefore, the insertion unit 141 can be easily inserted between the divided light guide panels 120a and 120b.

The head unit 142 has an area larger than that of the insertion unit 141. Further, the head unit 142 has a width larger than a separation distance between the adjacent light guide panels 120a and 120b. Therefore, the head unit 142 is arranged at edges of upper ends of the divided light guide panels 120a and 120b. That is, the head unit 142 is put over the edges of the upper ends of the light guide panels 120a and 120b facing each other with interposing the insertion unit 141 in order to prevent the fixing member 140 from falling between the divided light guide panels 120a and 120b. In addition, the head unit 142 presses the divided light guide panels 120a and 120b upward in order to prevent the divided light guide panels 120a and 120b from moving upward.

The fixing member 140 is arranged between the divided light guide panels 120a and 120b by including the insertion unit 141 and the head unit 142, thereby preventing the divided light guide panels 120a and 120b from moving horizontally and vertically.

The fixing member 140 can have a stripe shape to cross the bottom case 110 or a lattice shape to wrap a circumference of each of the light guide panels 120a and 120b.

The fixing members 140 can be made of material to transmit light, e.g., transparent plastic so as to minimize influence on image quality. In addition, the fixing members 140 can contain reflection material, e.g., TiO2 to impinge light leaked between the light guide panels 120a and 120b to the corresponding light guide panels 120a and 120b.

Further, reflection members 150 can be arranged at a lower part of each of the light guide panels 120a and 120b. The reflection members 150 reflect light emitted to the lower parts of the light guide panels 120a and 120b in order to re-impinge the light to the light guide panels 120a and 120b, thereby improving optical efficiency of the backlight unit.

In addition, the backlight unit can further include an optical member 160 which is supported by the fixing members 140 and arranged above the light guide panels 120a and 120b. Examples of the optical member 160 can include a diffusion plate, a diffusion sheet, a prism sheet and a protection sheet which are arranged above the light guide panels 120a and 120b. At this time, the optical member 160 is separated from the light guide panels 120a and 120b at a predetermined interval by the fixing members 140. Therefore, the light guide panels 120a and 120b can uniformly supply the light to the optical member 160.

Accordingly, the backlight unit in accordance with the embodiment of the present invention including the plurality of divided light guide panels for local dimming driving can prevent a defect due to the movement of the light guide panels by including the fixing members for preventing the movement of the divided light guide panels.

FIG. 3 is a cross-sectional view illustrating a backlight unit in accordance with a second embodiment of the present invention.

In the second embodiment of the present invention, the backlight unit has the same components as those of the above-mentioned first embodiment except for a reflection film. Therefore, in the second embodiment, the same components as those of the first embodiment are represented by the same reference numerals and overlapping description will be omitted.

Referring to FIG. 3, the backlight unit in accordance with the embodiment of the present invention includes a bottom case 110, a plurality of divided light guide panels 120a and 120b, light source units 130 and fixing members 140.

Each of the light guide panels 120a and 120b can include a first surface 121 to which light is impinged, a second surface 122 from which the light is emitted by being bent from an upper edge of the first surface 121, a third surface 123 which faces the second surface 122 and reflects the light to the second surface 122 and a fourth surface 124 which faces the first surface 123 and is connected to the second and third surfaces 122 and 123. At this time, the divided light guide panels 120a and 120b are arranged so that the first surface 121 and the fourth surface 124 face each other. For instance, in adjacent first and second light guide panels 120a and 120b among the divided light guide panels 120a and 120b, the first surface 121 of the first light guide panel 120a and the fourth surface 124 of the second light guide panel 120b face each other.

Each of the fixing members 140 includes an insertion unit 141 inserted between the plurality of divided light guide panels 120a and 120b, e.g., the first and second light guide panels 120a and 120b and a head unit 142 which is connected to the insertion unit 141 and arranged by being extended from edges of upper ends of the first and second light guide panels 120a and 120b.

The insertion unit 141 can include first and second inclined surfaces 141a and 141b connected to the head unit 142 by being expanded from an end portion to both sides. That is, the insertion unit 141 can have a triangle-shaped cross section.

Herein, any one of the first and second inclined surfaces can be inclined toward the first surface 121 of the light guide panel to which the light is impinged from the light source unit 130. For instance, in the adjacent first and second light guide panels 120a and 120b among the divided light guide panels 120a and 120b, the first surface 121 of the first light guide panel 120a and the first inclined surface 141a can face each other and the fourth surface 124 of the second light guide panel 120a and the second inclined surface 141b can face each other. Herein, the first inclined surface 141a is expanded toward an upper part of the first surface 121 and the second inclined surface 141b is expanded toward an upper part of the fourth surface 124.

At this time, a reflection film 143 is prepared on a lateral surface of the insertion unit 141, i.e., the first and second inclined surfaces 141a and 141b.

When light is supplied to the first surface 121 of the first light guide panel 120a, the reflection film 143 can supply a portion or the whole of the light leaked toward the fourth surface 124 of the second light guide panel 120b to the first light guide panel 12a, thereby preventing generation of a hot spot due to the light leaked between the divided light guide panels 120a and 120b. Herein, the hot spot is a bright spot defect where a portion of a screen is bright in comparison with the periphery.

The reflection film 143 can have an inclination expanded toward the upper part of the first surface 121 by the first inclined surface 141a, thereby effectively reflecting the light to the first surface 121. Herein, reflectance of the reflection film 143 and angles of the first and second inclined surfaces 141a and 141b are adjusted according to a brightness characteristic of the light source units 130 and material of the light guide panels 120a and 120b in order to improve the hot spot.

Therefore, the backlight unit of the present invention can prevent not only the movement of the divided light guide panels but also the generation of the hot spot by including the reflection film for reflecting a portion or the whole of the light leaked between the divided light guide panels at the fixing member.

FIG. 4 is a perspective view illustrating fixing members included in a backlight unit in accordance with a third embodiment of the present invention.

In the third embodiment of the present invention, the backlight unit has the same components as those of the above-mentioned first embodiment except for a fixing frame. Therefore, in the third embodiment, the same components as those of the first embodiment are represented by the same reference numerals and overlapping description will be omitted.

Referring to FIG. 4, the backlight unit in accordance with the embodiment of the present invention includes a bottom case 110, a plurality of divided light guide panels 120a and 120b, light source units 130, a plurality of fixing members 140 and a fixing frame 170.

The fixing frame 170 connects the plurality of fixing members 140 to each other. Specifically, the fixing frame has a rectangular frame shape, of which an inside is opened. Herein, the fixing members 140 are arranged on an opening of the fixing frame 170. Herein, as shown in the drawing, the fixing members 140 can have a stripe shape. However, the fixing members can have a lattice shape without limiting to this.

Meanwhile, the fixing members 140 and the fixing frame 170 can be integrated by being manufactured through molding. Or, the fixing members 140 and the fixing frame 170 can be coupled to each other by using a coupling device such as an adhesive or a coupling part.

Therefore, the plurality of fixing members 140 can be assembled to the divided light guide panels 120a and 120b by the fixing frame 170 at once, thereby improving assembly productivity in comparison with the case that the fixing members 140 are individually assembled.

Further, the fixing frame 170 can be coupled to the bottom case (referring to "110" in FIG. 1). Therefore, the plurality of fixing members 140 can be fixed to the bottom case 110, thereby more effectively fixing the divided light guide panels 120a and 120b.

Accordingly, the backlight unit in accordance with the embodiment of the present invention can improve the assembly productivity and a fixing property by including the fixing frame for connecting the plurality of fixing members to each other.

As described above, the backlight unit of the present invention includes the plurality of divided light guide panels in order to employ the local dimming driving method, wherein the fixing members are included between the light guide panels in order to prevent the light guide panels from moving individually. Therefore, it is possible to prevent the defect due to the movement of the light guide panels.

Further, the fixing members can prevent the generation of the hot spot by reflecting a portion of the whole of the light leaked between the light guide panels to the corresponding light guide panels.

As described above, although the preferable embodiments of the present invention have been shown and described, it will be appreciated by those skilled in the art that substitutions, modifications and changes may be made in these embodiments without departing from the principles and spirit of the general inventive concept, the scope of which is defined in the appended claims and their equivalents.

What is claimed is:

1. A backlight unit comprising:
    a bottom case including a receiving space;
    a plurality of divided light guide panels arranged in the receiving space in parallel;
    light source units arranged at one side of each of the divided light guide panels; and
    fixing members for preventing movement of the light guide panels by being arranged between the divided light guide panels.

2. The backlight unit of claim 1, wherein each of the fixing members includes an insertion unit inserted between the divided light guide panels and a head unit connected to the insertion unit and arranged at edges of upper ends of the divided light guide panels.

3. The backlight unit of claim 2, wherein the insertion unit includes first and second inclined surfaces connected to the head unit by being expanded from an end portion to both sides respectively.

4. The backlight unit of claim 2, further comprising:
    a reflection film for reflecting a portion or the whole of light by being arranged on the insertion unit.

5. The backlight unit of claim 1, further comprising:
    an optical member supported by the fixing members and arranged above the divided light guide panels.

6. The backlight unit of claim 1, further comprising:
    reflection members arranged at lower parts of each of the divided light guide panels.

7. The backlight unit of claim 1, wherein the fixing members are made of material to transmit light.

8. The backlight unit of claim 1, further comprising:
    a fixing frame which connects the fixing members to each other and is coupled to the bottom case.

* * * * *